United States Patent [19]

Press

[11] Patent Number: 5,745,572
[45] Date of Patent: Apr. 28, 1998

[54] CRYPTOGRAPHIC KEY MANAGEMENT

[75] Inventor: James Press, Biggleswade, England

[73] Assignee: International Computers Limited, Putney, United Kingdom

[21] Appl. No.: 588,072

[22] Filed: Jan. 17, 1996

[30] Foreign Application Priority Data

Feb. 24, 1995 [GB] United Kingdom ............... 9503738

[51] Int. Cl.⁶ .............................................. H04L 9/08
[52] U.S. Cl. ............................................ 380/21; 380/25
[58] Field of Search .................................... 380/21, 25

[56] References Cited

U.S. PATENT DOCUMENTS

| | | | |
|---|---|---|---|
| 4,850,017 | 7/1989 | Matyas, Jr. et al. | 380/21 |
| 4,918,728 | 4/1990 | Matyas et al. | 380/21 |
| 4,924,515 | 5/1990 | Matyas et al. | 380/25 |
| 4,941,176 | 7/1990 | Matyas et al. | 380/21 |
| 4,993,069 | 2/1991 | Matyas et al. | 380/25 |
| 5,007,089 | 4/1991 | Matyas et al. | 380/25 |
| 5,142,578 | 8/1992 | Matyas et al. | 380/21 |
| 5,432,849 | 7/1995 | Johnson et al. | 380/21 |

*Primary Examiner*—Salvatore Cangialosi
*Attorney, Agent, or Firm*—Lee, Mann, Smith, McWilliams, Sweeney & Ohlson

[57] ABSTRACT

A data processing system includes a number of applications, each of which has a cryptographic support facility (CSF) for securely managing cryptographic keys and performing cryptographic operations on behalf of the application. Each key has a 2-byte tag which is enciphered along with the key whenever the key is made available outside the CSF, to prevent unauthorized modification of the tag. Each tag indicates whether the key may be used as a basis for deriving data protection keys, whether keys derived from this key should be subject to cryptographic control policies, and whether the key should be subject to cryptographic control policies prior to use. Whenever the CSF is invoked to use a key, it enforces any restrictions imposed by the associated tag.

7 Claims, 5 Drawing Sheets

CRYPTOGRAPHIC KEY MANAGEMENT

BACKGROUND TO THE INVENTION

This invention relates to cryptographic key management in data processing systems. More specifically, the invention is concerned with a mechanism for enforcing cryptographic control policies.

The need for security in distributed systems is well recognised. The provision of some aspects of security requires the use of cryptography to provide data integrity and data confidentiality.

National security bodies have differing requirements on the types and strengths of cryptographic algorithms available for use (if at all) for the protection of user data. Often the use of strong cryptographic techniques by the security infrastructure is permitted (e.g. for key distribution, authentication, access control) whereas only weaker protection is permitted for user data. Sometimes strong integrity algorithms, but only weak confidentiality algorithms, are permitted for user data. Such requirements may be imposed either by the export authorities of the country from which a product containing cryptography is shipped, or by the national authorities of the country in which the product is used.

The policies specifying which cryptographic controls are to be applied can be defined in a file issued by the system supplier and tied into a specific customer (e.g. by hashing the file using a one-way function using the licence key and customer identity as initialisation vectors). Such controls could include:

- restrictions in maximum key length of asymmetric ciphers (e.g. 512 bits maximum modulus size for RSA);
- weakening of symmetric cipher keys (e.g. by applying the Commercial Data Masking facility described in U.S. Pat. No. 5,323,464 to DES keys before use);
- use of asymmetric ciphers for data integrity only;
- restrictions in the permitted modes of operations of a symmetric cipher (e.g. forbidding Triple DES modes).

However, a problem is that applications may not apply these policies rigorously, resulting in possible breaches of the national regulations.

The object of the present invention is to provide a mechanism for automatically applying and enforcing such cryptographic control policies when required.

A paper by R. W. Jones entitled "Some techniques for handling encipherment keys", ICL Technical Journal, 3 (2), 1982, pp. 175–188 describes a cryptographic system in which information (referred to as a tag) is appended to a cryptographic key to indicate how the key should be used. The item thus produced is referred to as a "tagged key". The keys are held in clear form only within secure, trusted modules, and whenever the key is made available outside of the secure modules (e.g. for key distribution), it will always be enciphered together with its key tags under a key encrypting key (KEK). Thus wherever the enciphered key is distributed, its key tags will go with it, and cannot be detached or modified except by the secure modules.

For example, it has been proposed that the key tags may be used to control:

- whether a key can be used to perform cryptographic operations on data or on other keys;
- whether the key may be used to encipher or decipher or both; and
- whether the key may be used for integrity seal generation or verification or both.

SUMMARY OF THE INVENTION

As will be shown, the present invention makes use of this key tagging concept, in order to support the control of the application of cryptographic control policies.

According to the invention, there is provided a cryptographic support facility for use in data processing system, said cryptographic support facility comprising means for securely managing cryptographic keys, each of said keys having a tag associated with it, characterised in that each of said tags indicates whether or not at least one of the following restrictions should be imposed on the use of the associated key:

i) whether the key may be used as a basis for deriving data protection keys;

ii) whether keys derived from this key should be subject to cryptographic control policies; and iii) whether the key should be subject to cryptographic control policies prior to use, and characterised in that said cryptographic support facility includes means for enforcing any restrictions imposed by said tags.

DESCRIPTION OF AN EMBODIMENT OF THE INVENTION

One embodiment of the invention will now be described by way of example with reference to the accompanying drawings.

Figure 1:
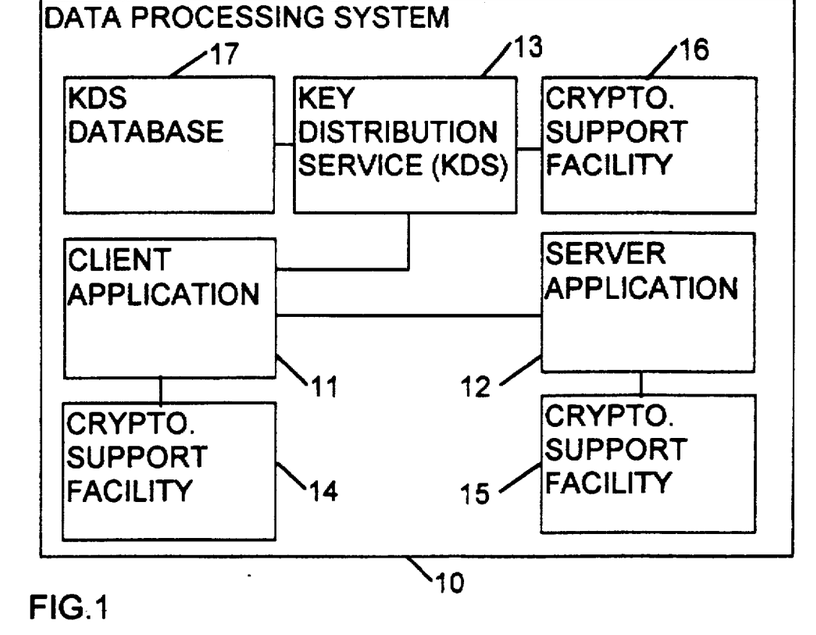
FIG. 1 is a block diagram of a distributed data processing system embodying the invention.

Referring to FIG. 1, this shows a distributed data processing system 10, including a number of applications 11,12. It is assumed that one of these applications 11 (referred to as the client) wishes to set up a secure communication with another application 12, referred to as the server. The system also includes a key distribution service (KDS) 13, whose purpose is to distribute cryptographic keys to the applications.

Each of the applications 11,12 and the KDS 13 has a respective cryptographic support facility (CSF) 14,15,16 associated with it. Each application 11,12 has its own key encrypting key (KEK), which is held securely in its own CSF. The KDS has a key database 17 which holds the KEKs of all the applications, encrypted under a master key MK, known only to the KDS's CSF 16.

Figure 2:
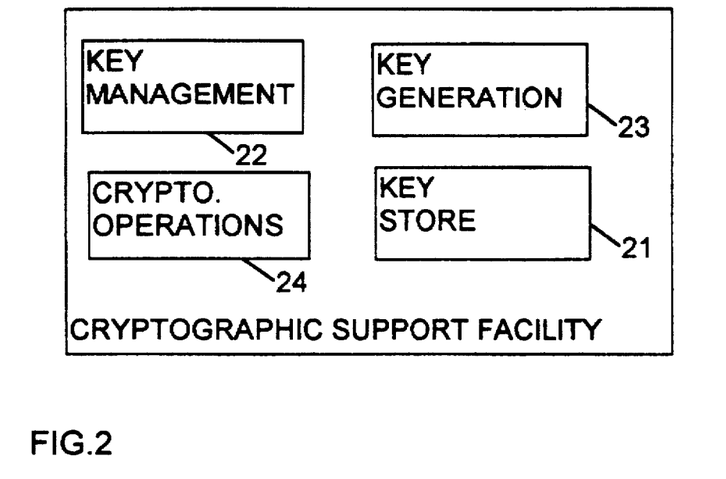
FIG. 2 is a block diagram showing a cryptographic support facility (CSF) in more detail.

FIG. 2 shows one of the CSFs 14,15,16 in more detail. The CSF is a trusted secure module, and includes a key store 21 in which it securely holds keys. Each key held in the store is identified by a handle, which allows the key to be referenced by the associated application or KDS without allowing direct access to the key itself.

Each CSF also includes a key management function 22, a key generation function 23 and a cryptographic operation function 24. The key management function 22 is used for checking key tags, and enforcing any restrictions imposed by those tags. The key generation function 23 is used for generating and deriving keys. The cryptographic operation function 24 is used for encryption, decryption and integrity protection.

Such a CSF is described in a paper by J. Press entitled "A New Approach to Cryptographic Facility Design", ICL Technical Journal, 8(3), May 1993, pp.492–505.

The cryptographic keys may for example be DES keys, as described in FIPS Pub 40, Data Encryption Standard, National Bureau of Standard (now National Institute of Standards and Technology), U.S. Department of Commerce, 1977.

Key Tagging Format

All keys used in the system have a one or two byte tag appended to them, which is stored along with the key. The key tagging format is shown below. Bit 7 denotes the most significant bit, and bit 0 denotes the least significant.

| Bit | Meaning if set (=1) |
| --- | --- |
| Byte 1: | |
| 7 | key can be used to protect data |
| 6 | key can be used to protect keys |
| 5 | key can be used to encipher |
| 4 | key can be used to decipher |
| 3 | key can be used for integrity seal generation |
| 2 | key can be used for integrity seal verification |
| 1 | reserved |
| 0 | continued in next byte |
| Byte 2: | |
| 7 | key can be used to derive other keys |
| 6 | derived keys (if allowed) are subject to cryptographic control policies |
| 5 | this key is subject to cryptographic control policies |
| 4 | reserved |
| 3 | reserved |
| 2 | reserved |
| 1 | reserved |
| 0 | reserved |

Note that a key can be tagged as being able to protect both data and keys. This is in order to support protocols where a single session key may be used to protect requests for keys and also to protect keys returned from the KDS.

If the continuation bit is not set in tag byte 1, then tag byte 1 will be the last (and only) tag byte; otherwise tag byte 2 will follow tag byte 1.

As will be described, the keys and their associated tags are encrypted together whenever they are sent outside the trusted CSF. Hence, users or user processes will be unable to modify the settings of the key tags. Whenever the CSF is invoked to use a key, it will take into account the key tags appended to that key, e.g. to determine whether it is permissible to use that key to derive other keys and whether to apply cryptographic control policies before the key is used.

Client Operation

Figure 3:
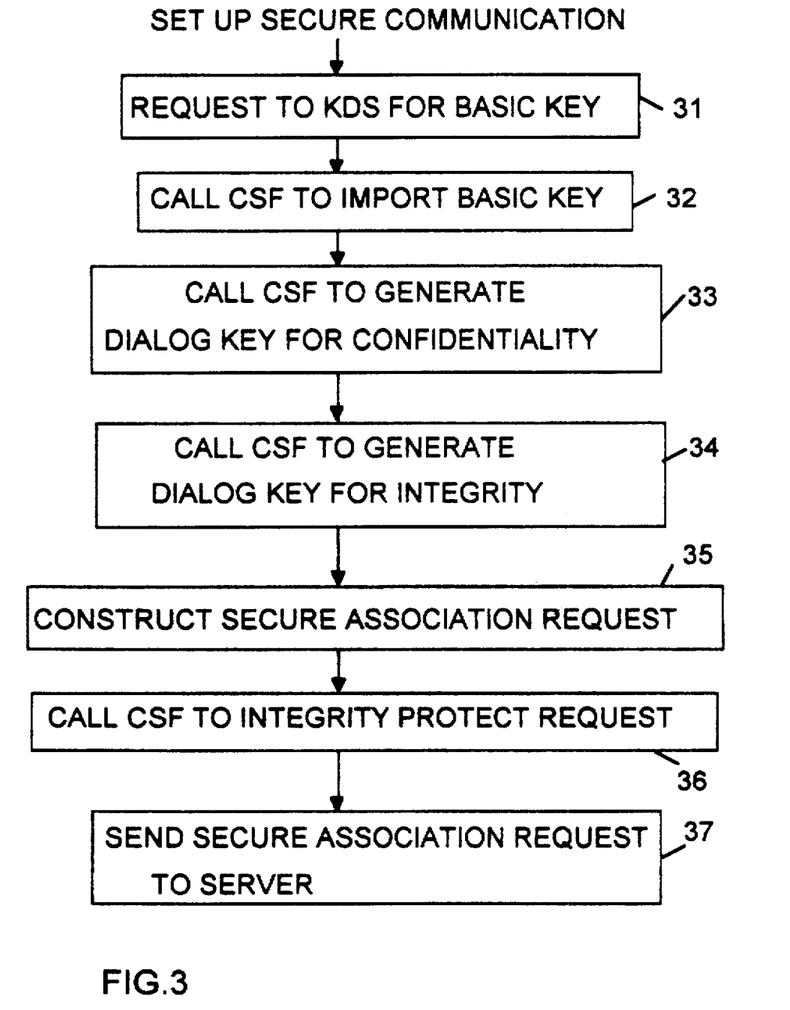
FIG. 3 is a flowchart showing the operation of a client application when it requires to set up a secure communication with a server application.

Referring to FIG. 3, this shows the operation of the client 11 when it wishes to set up a secure communication with the server 12.

(Step 31) The client first sends a request to the KDS, requesting a basic key (BK) to share with the server. In response to this call the KDS returns two versions of a basic key to the client: the first encrypted under the client's key encryption key (KEK) and the second encrypted under the server's KEK. The operation of the KDS in response to this call will be described in more detail later with reference to FIG. 4.

(Step 32) The client then calls its own CSF 14, requesting it to import the version of the basic key BK encrypted under the client's KEK. In response to this call, the CSF checks the KEK's tags, to verify that the KEK may be used for both key protection and deciphering. Assuming this check is satisfactory, the CSF decrypts the basic key, and stores the decrypted key in its key store 21. The CSF then returns a handle to the key, allowing the client to reference it later.

(Step 33) The client then calls its CSF 14 requesting it to generate a dialog key for confidentiality from the basic key BK. The client supplies a seed (a random number) for use in generating the dialog key. In response to this call, the CSF uses the basic key and the supplied seed to generate a dialog key. The CSF then returns a handle to the dialog key, together with a dialog key package, which contains the information to allow another application to recreate the same dialog key from the same basic key. The operation of the CSF in response to a call to generate a dialog key will be described in more detail later, with reference to FIG. 5.

(Step 34) The client then calls its CSF, requesting it to generate a dialog key for integrity from the basic key BK. Again, the CSF uses the basic key and the supplied seed to generate a dialog key, and returns a handle to the key and a dialog key package containing information to allow a peer of the caller to recreate the same dialog key.

(Step 35) The client then constructs a secure association request message containing the two dialog key packages returned by CSF, along with the version of the basic key BK encrypted under the server's KEK.

(Step 36) The client then calls its CSF to integrity protect this request message under the basic key. When it receives this call, the CSF checks the tags of the basic key, to verify that the key may be used for both data protection and integrity seal generation. If this check is satisfactory, the CSF uses its cryptographic operations function 23 to generate an integrity seal for the message.

(Step 37) The client then sends the sealed request to the server.

As will be described later with reference to FIG. 6, when the server receives this secure association request message, it similarly imports the encrypted basic key BK into its CSF and uses it and the accompanying dialog key packages to derive the same dialog keys as the client. The client and server may then use the dialog keys to send messages to each other in a secure manner.

The client and server may derive as many dialog keys for use between themselves as required, without further recourse to the KDS.

Request to KDS for Basic Key

Figure 4:
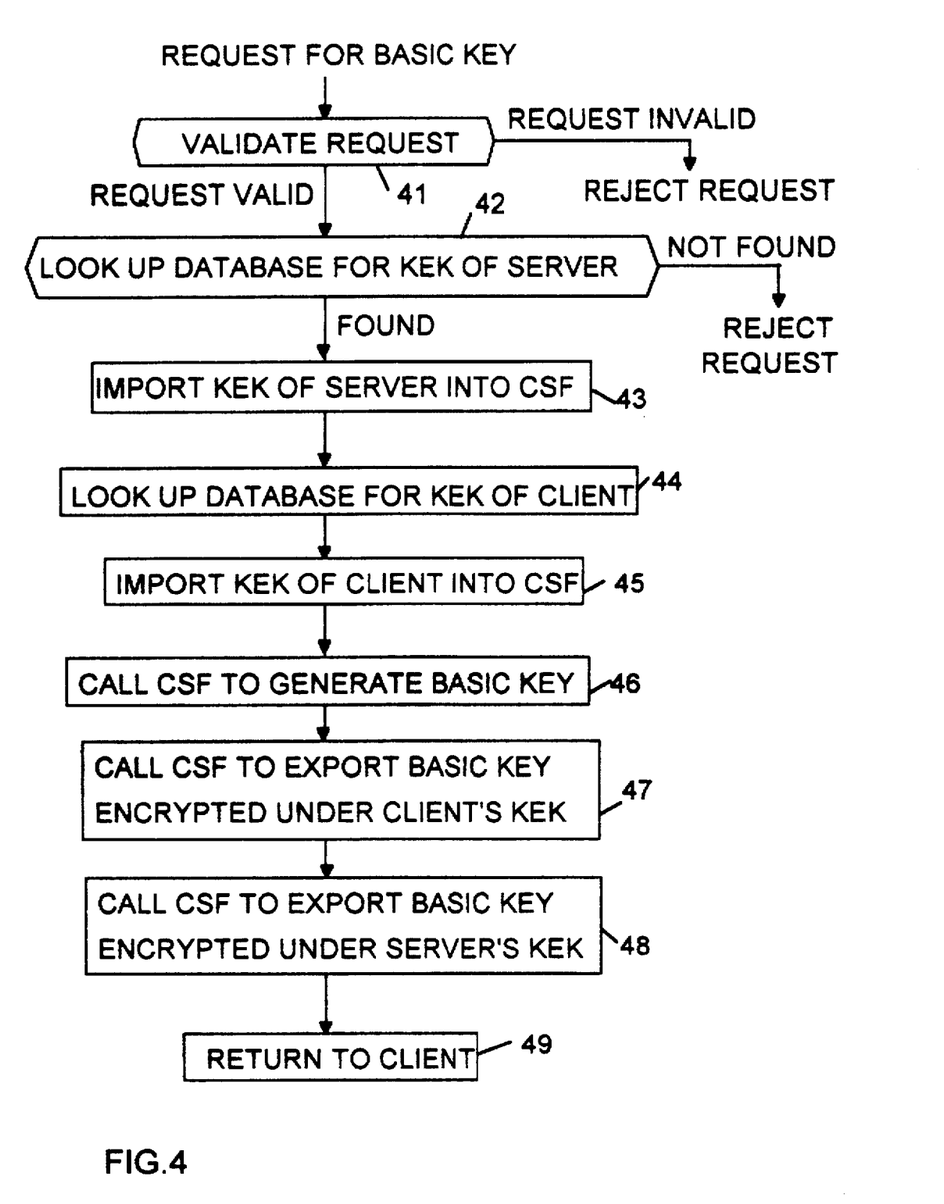
FIG. 4 is a flowchart showing the operation of a key distribution service when it is requested to supply a basic key.

Referring now to FIG. 4, this shows the operation of the KDS when it receives a request from a client for a basic key for use with a named server.

(Step 41) The KDS first validates the request. For example, the KDS may validate the origin of the request, check against replays, and check data integrity of the request. If the request is invalid, the KDS rejects it.

(Step 42) If the request is valid, the KDS looks up the database entry for the requested server. This contains the KEK of the server, encrypted under the KDS's master key MK. If the KDS cannot find any entry for the server in the database, the request is rejected.

(Step 43) Assuming an entry was found, the KDS then calls its CSF 16, instructing it to import the server's encrypted KEK. In response to this call, the CSF decrypts the encrypted KEK, using the master key MK. The CSF then stores the decrypted key in its secure key store 21, and returns a handle to the key.

(Step 44) The KDS then looks up the database entry for the client to obtain the KEK of the client, encrypted under the KDS's master key MK.

(Step 45) The KDS then calls its CSF 16, instructing it to import the client's encrypted KEK. As before, the CSF decrypts the encrypted KEK, using the master key MK, stores it in its secure key store, and returns a handle to the key. The KDS also checks whether the client is known to be part of the security infrastructure.

(Step 46) The KDS then calls its CSF 16 to generate a basic key BK, specifying that the tag values for the basic key are to be set as follows:

data protection
integrity seal generation/verification
key can be used to derive other keys
derived keys are subject to cryptographic control policies (if the client is not part of infrastructure).

In response to this call, the CSF generates the required basic key, with the required tag.

(Step 47) The KDS then calls its CSF 16, requesting it to export the basic key BK under the protection of the client's KEK. In response to this call, the CSF encrypts the basic key value, along with its key tag and other control information (such as key lifetimes), using the client's KEK. The CSF then returns the encrypted key to the KDS.

(Step 48) The KDS then calls its CSF 16, requesting it to export the basic key BK under the protection of the server's KEK. In response to this call, the CSF encrypts the basic key value, along with its key tags and other control information (such as key lifetimes), using the server's KEK. The CSF returns the encrypted key to the KDS.

(Step 49) Finally, the KDS returns the two encrypted versions of the basic key BK to the client.

Dialog Key Generation

Figure 5:
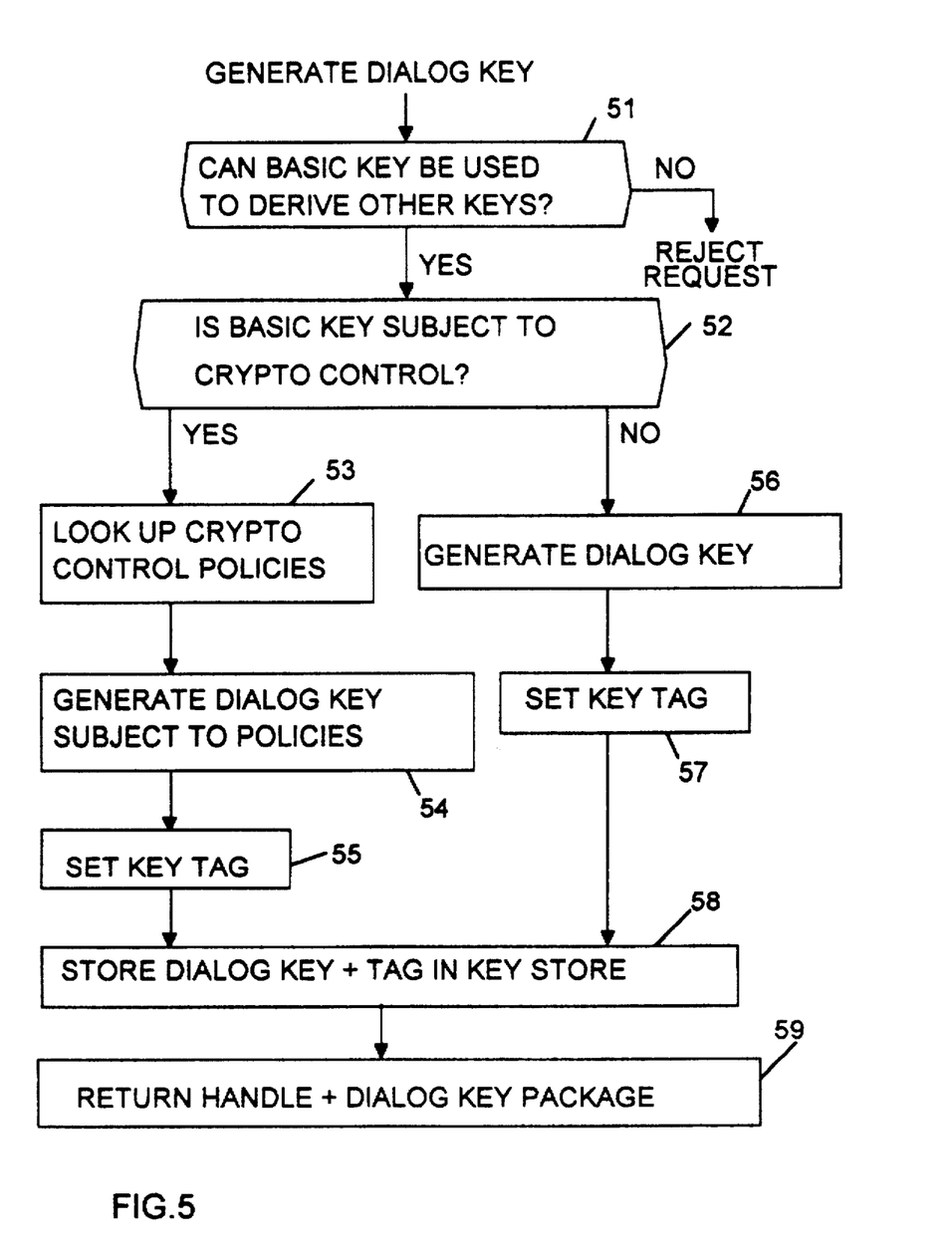
FIG. 5 is a flowchart showing the operation of the CSF when it is requested to generate a dialog key.

Referring now to FIG. 5, this shows the operation of a CSF when it receives a call requesting it to generate a dialog key. The call includes the handle of the basic key BK, and also includes a seed value to be used in key generation.

(Step 51) The CSF first accesses the basic key BK in its key store 21, and checks that this key has bit 7, of tag byte 2 set, indicating that this key can be used to derive other keys. If this tag bit is not set, the request is rejected.

(Step 52) The CSF then checks whether the basic key BK has bit 6 of tag byte 2 set, indicating that any derived keys are subject to cryptographic control policies. If the tag bit is set, the CSF proceeds to step 53 below; if not, it proceeds to step 56.

(Step 53) If the tag indicates that derived keys are subject to cryptographic control policies, the CSF looks up the cryptographic control policies that apply for the intended algorithm and use.

(Step 54) The CSF then generates a dialog key value by applying a one-way function OWF to the basic key BK and the seed value. The CSF applies the cryptographic control policies to ensure that the generated key is subject to these policies. For example, if the algorithm is DES and the intended use is confidentiality, then the CSF applies the Commercial Data Masking Facility referred to above to the generated DES key value to produce a weakened key value.

(Step 55) The CSF sets the tag values of the dialog key as follows:

data protection
encipher/decipher (if confidentiality is requested and cryptographic controls policies permit—e.g. RSA can be used for integrity but not confidentiality)
integrity generation/verification (if integrity is requested and cryptographic controls policies permit)
key subject to cryptographic controls policies (allow other operational controls to be applied, e.g. forbidding certain modes of operations of a cipher)

(Step 56) If the tag indicates that derived keys are not subject to any cryptographic control policies, the CSF generates a dialog key value by applying the OWF to the basic key BK and the seed value.

(Step 57) The CSF sets the tag values of the dialog key as follows:

data protection
encipher/decipher (if confidentiality is requested)
integrity generation/verification (if integrity requested)

(Step 58) The CSF stores the dialog key in its key store 21, along with its tag.

(Step 59) Finally, the CSF returns a handle to the dialog key to caller, along with a dialog key package containing the information to allow a peer of the caller to recreate the same dialog key from the same basic key BK. This package comprises the identity of the OWF and the seed value used to generate the basic key.

Server Operation

Figure 6:
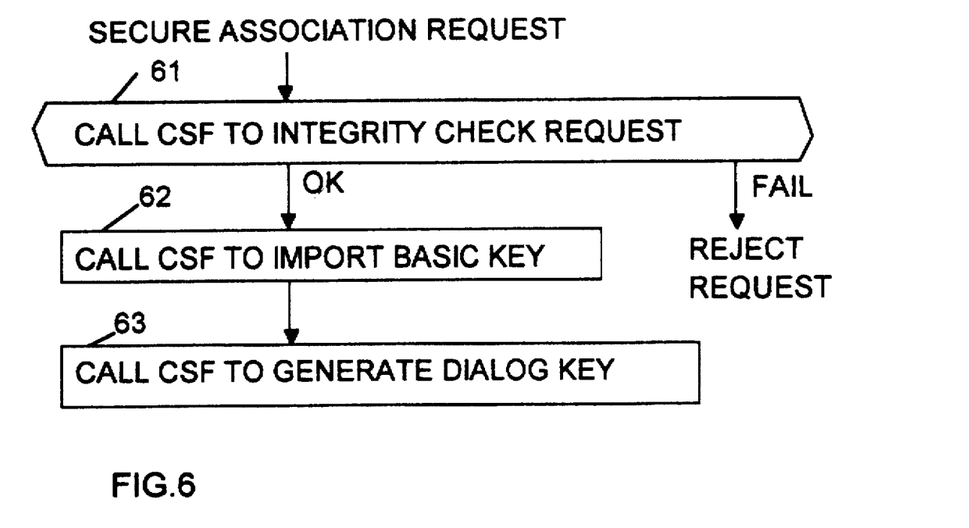
FIG. 6 is a flowchart showing the operation of the server application when it receives a secure association request message from the client application.

Referring now to FIG. 6, this shows the operation of the server when it receives the secure association request message from the client.

(Step 61) The server first calls its own CSF 15 to check the integrity of the secure association request message. The CSF will also check the tags of the basic key BK to verify that it may be used for both data protection and integrity seal verification. If this check fails, the request is rejected.

(Step 62) Assuming the check is satisfactory, the server then calls its CSF 15, requesting it to import the version of the basic key BK encrypted under the server's KEK. The CSF checks the tags of this KEK to verify that it may be used for both key protection and deciphering. Assuming this check is satisfactory, the CSF decrypts the basic key, stores it, and returns a handle to the key, allowing the client to reference it.

(Step 63) The server then calls its CSF 15, requesting it to generate dialog keys for confidentiality and integrity from the basic key BK and the dialog key packages.

Dialog Key Usage

After these dialog keys have been generated, the client and server applications may call their respective CSFs to use this key for enciphering, deciphering, integrity seal generation, and integrity seal verification.

Figure 7:
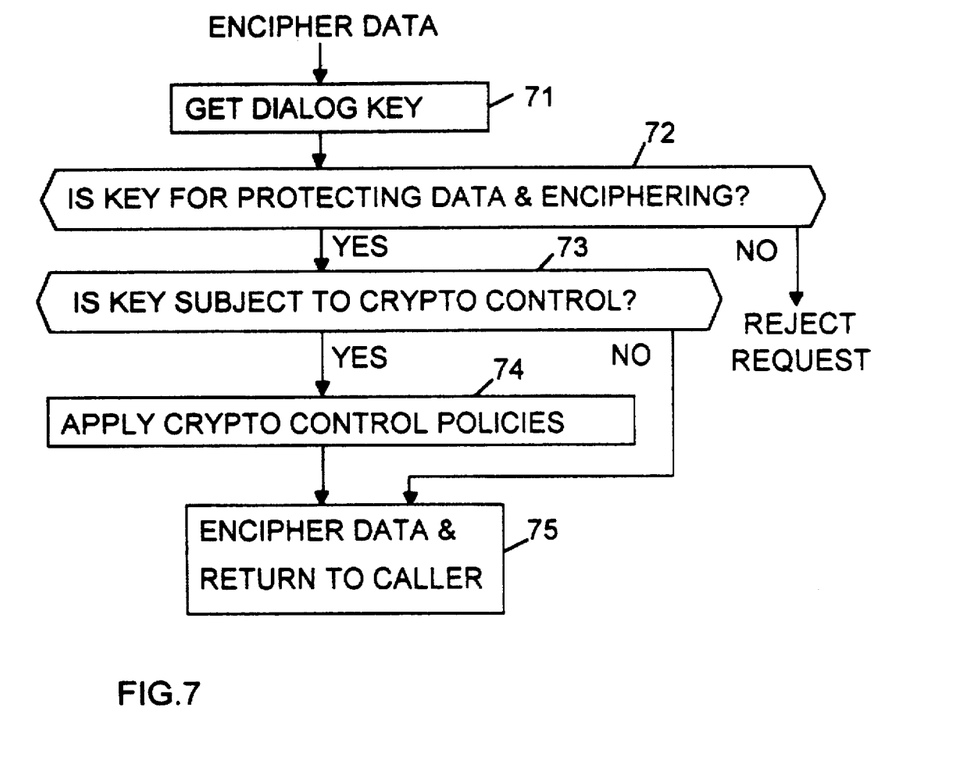
FIG. 7 is a flowchart showing the operation of the CSF when it is called to encipher data under the dialog key.

Referring now to FIG. 7, this shows the operation of a CSF when called by an application to encipher data. The call includes the data to be enciphered, along with the handle of the dialog key to be used.

(Step 71) The CSF first retrieves the dialog key from its secure key store 21, using the handle to reference the key.

(Step 72) The CSF then checks the key tags of the dialog key, to verify whether it may be used to protect data and may be used to encipher. If the key fails these checks, the request is rejected.

(Step 73) Assuming the checks are satisfactory, the CSF then checks whether bit 5 of tag byte 2 is set, indicating that this key is subject to cryptographic control policies.

(Step 74) If the key is subject to cryptographic control policies, the CSF looks up any cryptographic control policies that apply for the intended algorithm and use, and enforces these policies. For example, this may involve forbidding certain modes of operation of a cipher, for instance triple encryption modes.

(Step 75) Finally, the CSF enciphers the data, and returns the enciphered data to the caller.

Similar measures are taken by the CSF to enforce cryptographic control policies for deciphering, integrity seal generation and integrity seal verification.

Directly Generated Keys

The above description has discussed how the CSFs enforce the application of cryptographic control policies to dialog keys which are derived by two peers from basic keys generated by the key distribution service (KDS). The CSFs are also able to enforce the application of cryptographic control policies to keys which are generated directly (i.e. generated by applications rather than by the KDS), as will now be described.

The default action of a CSF is to apply cryptographic control policies to all keys that are generated or derived unless overridden by the KDS. In the case of derived keys, the tagging of the basic key (generated by the KDS) controls whether the derived dialog keys will be subject to cryptographic control policies. In the case of keys generated by applications, these will be subject to cryptographic control policies. In some circumstances, it may be required that direct key generation facilities are not available to applications thus making key derivation the only option.

It should be noted that under the scheme described above, a derived key is tagged so that it cannot be used itself in order to derive other keys. Thus, if direct key generation is not available to applications, keys can only be derived from basic key generated by the KDS.

The KDS will have a special version of the direct key generation interface to the CSF which allows the KDS to direct the settings of the key tags for:

whether keys can be derived from the key whether derived keys are subject to cryptographic control policies whether the key is subject to cryptographic control policies whether key tagging is not to be applied.

This will allow the KDS to generate keys that are not subject to cryptographic control policies for use by the security infrastructure. It will also allow the KDS to generate untagged keys for use with external systems, such as Kerberos, DCE and SESAME, that do not support tagged keys and thus would misinterpret the key tags as part of the key value.

It should be noted that in the case of Kerberos and DCE, the KDS could still request that the CSF apply cryptographic control policies on a generated session key in order to weaken the privacy of user data communicated between a Kerberos or DCE client and server (as these are using the KDS of an export controlled product). This cannot be done for SESAME, as a basic key is generated from which dialog keys are derived external to the export controlled product. The KDS would thus need a mappings of target application to security system type in order to know whether the target application would understand tagged keys.

It will be appreciated that many other modifications may also be made to the system described above without departing from the scope of the invention.

I claim:

1. A cryptographic support facility for use in data processing system, said cryptographic support facility comprising:

(a) means for storing at least one cryptographic key;

(b) means for storing a tag for said cryptographic key, said tag including a code indicating whether it is permissible for said cryptographic key to be used as a basis for generating new keys;

(c) means for receiving a request to generate a new key using said cryptographic key as a basis;

(d) means responsive to said request, for accessing the tag of said cryptographic key to check said code; and (e) means for generating said new key in the event that said code indicates that it is permissible for said cryptographic key to be used as a basis for generating new keys.

2. A cryptographic support facility according to claim 1 wherein said tag also includes a second code indicating whether new keys are subject to cryptographic control policies, and wherein the cryptographic support facility includes:

(a) means for checking said second code; and (b) means for applying said cryptographic control policy to said new key in the event that said second code indicates that new keys are subject to cryptographic control policy.

3. A cryptographic support facility according to claim 2 wherein said cryptographic control policy comprises a maximum length restriction on said new keys.

4. A data processing system comprising a plurality of cryptographic support facilities, each of said cryptographic support facilities comprising:

(a) means for storing at least one cryptographic key;

(b) means for storing a tag for said cryptographic key, said tag including a code indicating whether it is permissible for said cryptographic key to be used as a basis for deriving new keys;

(c) means for receiving a request to generate a new key, said request specifying said cryptographic key as a basic key to be used in generating said new key;

(d) means responsive to said request, for accessing the tag of said cryptographic key to said code; and (e) means for rejecting said request when said code indicates that it is impermissible for said cryptographic key to be used as a basis for deriving new keys.

5. A method of operating a data processing system comprising a key distribution service having a first cryptographic support facility, and at least one data processing application having a second cryptographic support facility, said method comprising the steps:

(a) generating at least one cryptographic key in said first cryptographic support facility;

(b) creating a tag for said cryptographic key, said tag including a code indicating whether it is permissible for said cryptographic key to be used as a basis for deriving new keys;

(c) causing said key distribution service to access said first cryptographic support facility to obtain said key, enciphered along with said tag, and to send said key, enciphered along with said tag, to said data processing application;

(d) causing said data processing application to import said key, along with said tag, into said second cryptographic support facility;

(e) causing said data processing application to send a call to said second cryptographic support facility, requesting the second cryptographic support facility to generate a new key; and (f) causing said second cryptographic support facility, in response to said call, to check the code in said tag and to generate said new key unless said code indicates that it is impermissible for said cryptographic key to be used as a basis for deriving new keys.

6. A method of operating a data processing system according to claim 5, wherein said tag also includes a second code indicating whether said new keys are subject to cryptographic control policies, the method including the additional steps:

(a) checking said tag to determine whether said second code indicates that new keys are subject to a cryptographic control policy; and (b) applying said cryptographic control policy to said new key in the event that said second code indicates that new keys are subject to cryptographic control policy.

7. A method according to claim 6 wherein said cryptographic control policy comprises a maximum length restriction on said new keys.

* * * * *